United States Patent
Kagitani et al.

(10) Patent No.: US 9,835,351 B1
(45) Date of Patent: Dec. 5, 2017

(54) AIR CONDITIONER CONTROLLING METHOD

(71) Applicant: Kojimachi Engineering Co., Ltd., Tokyo (JP)

(72) Inventors: Michio Kagitani, Yokohama (JP); Isao Okayasu, Kawasaki (JP); Munemasa Kobayashi, Kamakura (JP)

(73) Assignee: KOJIMACHI ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 15/460,199

(22) Filed: Mar. 15, 2017

(51) Int. Cl.
*G05B 13/00* (2006.01)
*F24F 11/00* (2006.01)
*F24F 12/00* (2006.01)
*F24F 3/044* (2006.01)

(52) U.S. Cl.
CPC .......... *F24F 11/008* (2013.01); *F24F 3/0442* (2013.01); *F24F 11/006* (2013.01); *F24F 11/0012* (2013.01); *F24F 12/001* (2013.01); *F24F 2011/0013* (2013.01)

(58) Field of Classification Search
CPC ..... F24F 11/006; F24F 11/0012; G05B 15/02; G05B 17/02; G05B 2219/2614; G05B 2219/39361; G05B 2219/49068; G06Q 10/04; G06F 1/206; G06F 1/20; Y02B 60/1275; Y02B 10/24
See application file for complete search history.

(56) References Cited

U.S. PATENT DOCUMENTS

| | | | | |
|---|---|---|---|---|
| 4,217,761 A | * | 8/1980 | Cornaire | G01K 17/08 165/11.1 |
| 5,170,935 A | * | 12/1992 | Federspiel | F24F 11/0009 236/44 C |
| 7,797,080 B2 | * | 9/2010 | Durham, III | F24F 11/006 700/276 |

(Continued)

FOREIGN PATENT DOCUMENTS

| | | |
|---|---|---|
| JP | 3990143 | 5/2003 |
| JP | 2014059124 | 4/2014 |

OTHER PUBLICATIONS

English Abstract of JP 2014059124.
English Abstract of JP 3990143.

*Primary Examiner* — Darrin Dunn
(74) *Attorney, Agent, or Firm* — Preston Smirman; Smirman IP Law, PLLC

(57) ABSTRACT

An air conditioner controlling method includes: deciding on a supply-air temperature Ts and a return-air temperature Tr as specified design values; deciding that the total heat-exchange efficiency η is zero; selecting two or more stepped levels of the outdoor-air volume percentage α; deriving a linear function which expresses a relation between an outdoor-air temperature To and a mixed-air temperature Tm for each level of the outdoor-air volume percentage α by using the return-air temperature Tr and the total heat-exchange efficiency η; and deciding on the range where the mixed-air temperature Tm is lower than the supply-air temperature Ts for each of the linear functions and the range where the mixed-air temperature Tm in each linear function comes closest to the supply-air temperature Ts as compared with the mixed-air temperatures Tm in the other linear functions.

3 Claims, 9 Drawing Sheets

Schematic Configuration of Air-conditioning System

(56) References Cited

U.S. PATENT DOCUMENTS

| | | | |
|---|---|---|---|
| 7,827,813 B2* | 11/2010 | Seem | F24F 11/0001 236/44 C |
| 8,543,244 B2* | 9/2013 | Keeling | F24D 19/1066 700/276 |
| 8,688,278 B2* | 4/2014 | Kreft | F24F 3/044 454/229 |
| 9,021,820 B2* | 5/2015 | Yahia | B60H 1/00921 165/202 |
| 2008/0234869 A1* | 9/2008 | Yonezawa | F24F 11/0086 700/276 |
| 2009/0065173 A1* | 3/2009 | Wiggs | F24J 3/08 165/45 |
| 2010/0094434 A1* | 4/2010 | Ballet | F25B 1/10 700/28 |
| 2012/0173444 A1* | 7/2012 | Zik | G06Q 10/10 705/317 |
| 2014/0012552 A1* | 1/2014 | Zik | G06Q 10/10 703/2 |
| 2014/0244051 A1* | 8/2014 | Rollins | G05D 27/02 700/282 |
| 2015/0134124 A1* | 5/2015 | Carter | G05D 23/1923 700/278 |
| 2016/0054018 A1* | 2/2016 | Motodani | F24F 11/001 700/276 |
| 2016/0187896 A1* | 6/2016 | Jones | H04L 12/2816 700/276 |
| 2016/0313020 A1* | 10/2016 | Wallace | F28F 27/00 |

* cited by examiner

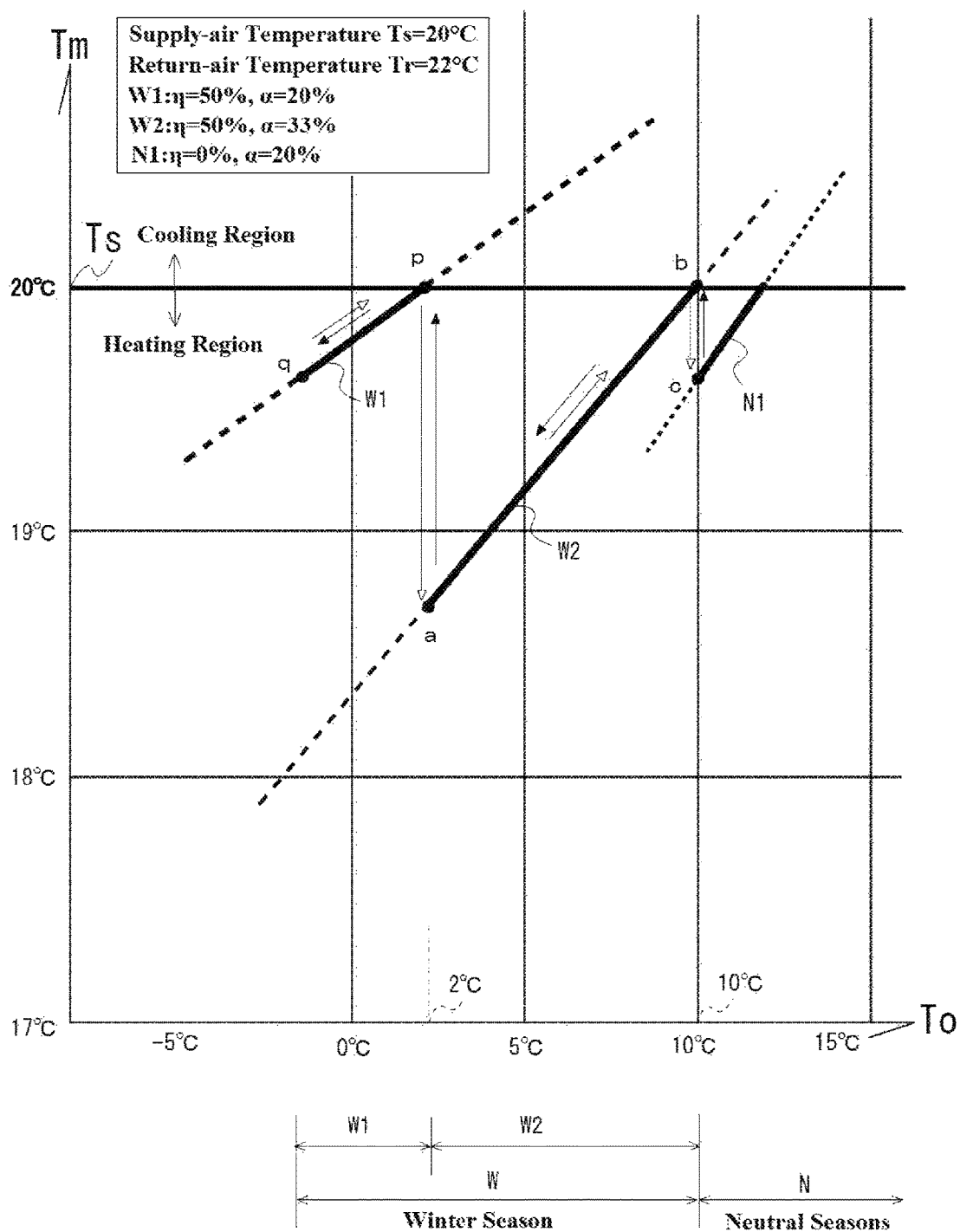

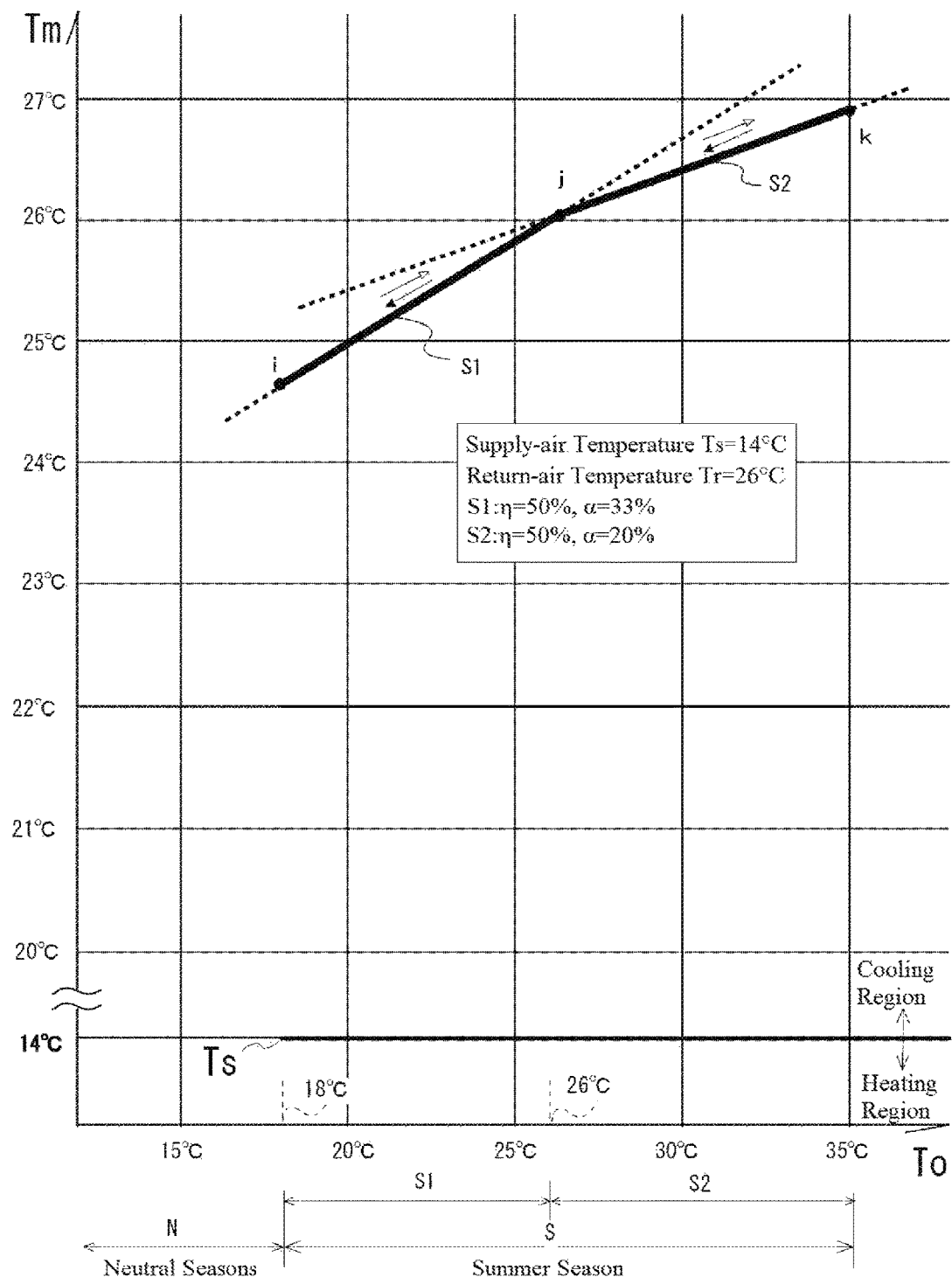

FIG.7

| Seasonal Divisions | Supply-air Temperature Ts | Return-air Temperature Tr | Total Heat-exchange Efficiency η | Outdoor-air Volume Percentage α | Setting Retention Range (To-Tm Linear Function) | Outdoor-air Temperature Range To | Practical Period |
|---|---|---|---|---|---|---|---|
| Neutral Season (Spring) | 20°C | 22°C | 0% | 20% | N1 | 10-12°C | March |
| | 20°C | 22°C | | 33% | N2 | 12-16°C | First Half of April |
| | 20°C | 22°C | | 50% | N3 | 16°C-18°C | Latter Half of April |
| Summer Season | 14°C | 26°C | 50% | 33% | S1 | 18°C-30°C | May/June |
| | 14°C | 26°C | | 20% | S2 | >30°C | July/August |
| | 14°C | 26°C | | 33% | S1 | 30°C-18°C | September |
| Neutral Season (Autumn) | 20°C | 22°C | 0% | 50% | N3 | 18°C-16°C | October |
| | 20°C | 22°C | | 33% | N2 | 16-12°C | First Half of November |
| | 20°C | 22°C | | 20% | N1 | 12-10°C | Latter Half of November |
| Winter Season | 20°C | 22°C | 50% | 33% | W2 | 10°C-2°C | December |
| | 20°C | 22°C | | 20% | W1 | <2°C | January |
| | 20°C | 22°C | | 33% | W2 | 2°C-10°C | February |

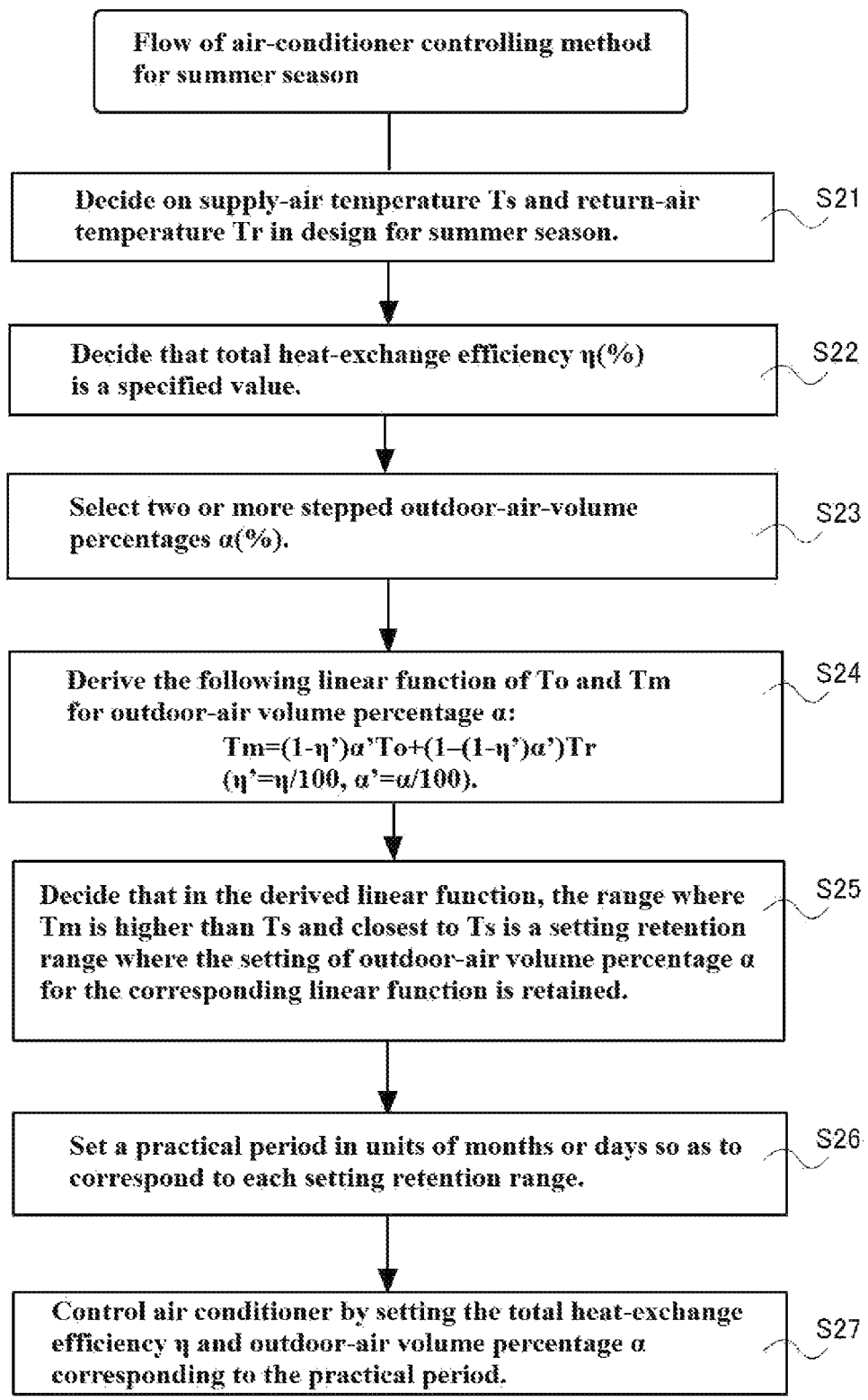

AIR CONDITIONER CONTROLLING METHOD

FIELD OF THE INVENTION

The present invention relates to a controlling method for an air conditioner in a central air-conditioning system.

BACKGROUND OF THE INVENTION

Medium to large buildings are provided with an air-conditioning facility in a central air-conditioning system. Nowadays, the use of district cooling-and-heating systems is widespread, and such buildings are each supplied with hot water and chilled water from a cold heat source in a common district. The individual buildings are provided with an air conditioner which cools or heats the air inside of the building by taking air from the outdoor and regulating the air temperature using chilled water or hot water. In general, an air conditioner is controlled so that an indoor air temperature can be constantly maintained at a specified value regardless of variations in the outdoor air according to the seasons. In energy-saving technologies provided in public, an air conditioner is variously controlled according to the conditions of the outdoor air so that the consumption of chilled water or hot water can be reduced to the minimum.

Japanese Patent Laid-Open Publication No. 2014-59124 provides an air-conditioning control system which includes an air conditioner and a ventilation system provided separately from the air conditioner. The ventilation system makes a total heat exchange between outdoor air and exhaust air to regulate the temperature of the outdoor air, thereby saving the energy consumed in an air-conditioning facility.

Japanese Patent Publication No. 3990143 provides an outdoor-air cooling system which humidifies return air and mixes the return air with outdoor air. At this time, the volume of the outdoor air is controlled so that the temperature of the mixed air becomes equal to a supply-air temperature. This enables a chilled-water coil to stop operating, thereby reducing the energy consumption.

SUMMARY OF THE INVENTION

Problems to be Solved by the Present Invention

The temperature of outdoor air varies largely in accordance with the four seasons, and in response to such variations in the outdoor-air temperature, there is a great demand for energy-saving technologies throughout the year. However, a controlling method for an air conditioner has not yet been proposed which is capable of saving energy all year round and which is easily realized without largely altering the construction of an existing system.

In the present situation, air-conditioning facilities for buildings generally execute control so that settings for air conditioning in the winter season are retained in the spring season alike and settings for air conditioning in the summer season are retained in the autumn season alike. The above settings are designed, for example, such that a total heat-exchange efficiency between outdoor air and exhaust air, or an outdoor-air volume percentage in supply air (a mixture of outdoor air and return air) is constantly at a specified value. As a result, if the temperature of mixed air formed by mixing outdoor air with return air is higher or lower than a specified supply-air temperature, then the mixed air needs to be cooled in a cooling coil using chilled water or heated in a heating coil using hot water so that the temperature thereof becomes equal to the supply-air temperature.

The outdoor air is comfortable in the neutral seasons of spring and autumn, but even if outdoor air is directly sent into a room, then it would be difficult to constantly keep the room comfortable (i.e., to maintain a specified supply-air temperature). This is because the outdoor-air temperature is variable and heat is produced indoors. Hence, even in the neutral seasons, the supply of chilled water and hot water is practically frequently regulated, thereby increasing the consumption of energy. In the neutral seasons, the above total heat-exchange efficiency and outdoor-air volume percentage are set to the same values as those in the winter season or the summer season, respectively, which is a crucial factor in the energy-consumption increase.

In the winter season alike, chilled water is frequently used, thereby wasting energy. On the other hand, in the summer season, a large quantity of chilled water needs utilizing, and it would be desirable to reduce the chilled-water consumption to a minimum.

Ideally speaking, a specified supply-air temperature should be maintained without utilizing chilled water or hot water throughout the year. For this purpose, it is necessary to control an air conditioner so that at least the total heat-exchange efficiency and the outdoor-air volume percentage are equal to desirable values in real time. However, a general air-conditioning system is capable of controlling a total heat exchanger thereof only by two values, or specifically, whether the total heat exchanger is stopped (the total heat-exchange efficiency is zero) or in operation (the total heat-exchange efficiency is retained at a specified value.) Further, in order to change the outdoor-air volume percentage in the system, the degree of opening of an outdoor-air damper thereof has to be mechanically adjusted, and the outdoor-air damper is currently controlled by only approximately two to three steps.

Therefore, practically in the neutral seasons and winter season, a minimum quantity of hot water should be utilized without chilled water, and in the summer season, a minimum quantity of chilled water should be utilized. Accordingly, if a controlling method for the above operation is realized, the method itself is expected to have a great energy-saving effect.

In view of the present situation described above, it is an object of the present invention to provide a controlling method for an air conditioner which is easily realized without largely altering the construction of an existing air-conditioning system and which is capable of obtaining an energy-saving effect in any season of the neutral seasons of spring and autumn and the winter and summer seasons.

Means for Solving the Problems

In order to accomplish the object, the present invention provides the follow configurations. The reference characters and/or numerals in parentheses are given for reference to the Figures described later.

In accordance with the general teachings of the present invention, an air conditioner controlling method for, in the process of deciding on a total heat-exchange efficiency ($\eta$) and an outdoor-air volume percentage ($\alpha$) in neutral seasons (N), includes: deciding on a supply-air temperature (Ts) and a return-air temperature (Tr) as specified design values; deciding that the total heat-exchange efficiency $\eta$ is zero; selecting two or more stepped levels of the outdoor-air volume percentage $\alpha$; deriving a linear function which expresses a relation between an outdoor-air temperature (To)

and a mixed-air temperature (Tm) for each level of the outdoor-air volume percentage α by using the return-air temperature Tr and the total heat-exchange efficiency η; and deciding on the range where the mixed-air temperature Tm is lower than the supply-air temperature Ts for each of the linear functions and the range where the mixed-air temperature Tm in each linear function comes closest to the supply-air temperature Ts as compared with the mixed-air temperatures Tm in the other linear functions, and thereby, deciding on a setting retention range (N1, N2, N3) where the setting of each level of the outdoor-air volume percentage α corresponding to each linear function in the neutral seasons N is retained.

An air conditioner controlling method according to a first aspect of the present invention includes: forming mixed air (M) by mixing outdoor air (OA) having a predetermined outdoor-air temperature To with return air (RA) having a predetermined return-air temperature Tr at a predetermined outdoor-air volume percentage α, the outdoor air OA making a total heat exchange with exhaust air (EA) at a predetermined total heat-exchange efficiency η; and if a mixed-air temperature Tm of the mixed air M differs from a specified supply-air temperature Ts, then cooling or heating the mixed air M and sending supply air (SA) having the specified supply-air temperature Ts, comprising the steps of:

in the process of deciding on the total heat-exchange efficiency η and the outdoor-air volume percentage α in the neutral seasons N, (a) deciding on the supply-air temperature Ts and the return-air temperature Tr as specified design values;

(b) deciding that the total heat-exchange efficiency η is zero;

(c) selecting two or more stepped levels of the outdoor-air volume percentage α;

(d) deriving a linear function which expresses a relation between the outdoor-air temperature To and the mixed-air temperature Tm for each level of the outdoor-air volume percentage α by using the return-air temperature Tr and the total heat-exchange efficiency η; and (e) deciding that in the range where the mixed-air temperature Tm is lower than the supply-air temperature Ts for each of the linear functions within the range of the outdoor-air temperature To in the neutral seasons N, the range where the mixed-air temperature Tm in each linear function comes closest to the supply-air temperature Ts as compared with the mixed-air temperatures Tm in the other linear functions is a setting retention range N1, N2, N3 where the setting of the outdoor-air volume percentage α in the corresponding linear function is retained.

An air conditioner controlling method according to a second aspect of the present invention includes: forming mixed air M by mixing outdoor air OA having a predetermined outdoor-air temperature To with return air RA having a predetermined return-air temperature Tr at a predetermined outdoor-air volume percentage α, the outdoor air OA making a total heat exchange with exhaust air EA at a predetermined total heat-exchange efficiency η; and if a mixed-air temperature Tm of the mixed air M differs from a specified supply-air temperature Ts, then cooling or heating the mixed air M and sending supply air SA having the specified supply-air temperature Ts, comprising the steps of:

in the process of deciding on the total heat-exchange efficiency η and the outdoor-air volume percentage α in the winter season (W), (a) deciding on the supply-air temperature Ts and the return-air temperature Tr as specified design values;

(b) deciding that the total heat-exchange efficiency η is a specified value;

(c) selecting two or more stepped levels of the outdoor-air volume percentage α;

(d) deriving a linear function which expresses a relation between the outdoor-air temperature To and the mixed-air temperature Tm for each level of the outdoor-air volume percentage α by using the return-air temperature Tr and the total heat-exchange efficiency η; and (e) deciding that in the range where the mixed-air temperature Tm is lower than the supply-air temperature Ts for each of the linear functions within the range of the outdoor-air temperature To in the winter season W, the range where the mixed-air temperature Tm in each linear function comes closest to the supply-air temperature Ts as compared with the mixed-air temperatures Tm in the other linear functions is a setting retention range (W1, W2) where the setting of the outdoor-air volume percentage α in the corresponding linear function is retained.

An air conditioner controlling method according to a third aspect of the present invention includes: forming mixed air M by mixing outdoor air OA having a predetermined outdoor-air temperature To with return air RA having a predetermined return-air temperature Tr at a predetermined outdoor-air volume percentage α, the outdoor air OA making a total heat exchange with exhaust air EA at a predetermined total heat-exchange efficiency η; and if a mixed-air temperature Tm of the mixed air M differs from a specified supply-air temperature Ts, then cooling or heating the mixed air M and sending supply air SA having the specified supply-air temperature Ts, comprising the steps of:

in the process of deciding on the total heat-exchange efficiency η and the outdoor-air volume percentage α a the summer season (S), (a) deciding on the supply-air temperature Ts and the return-air temperature Tr as specified design values;

(b) deciding that the total heat-exchange efficiency η is a specified value;

(c) selecting two or more stepped levels of the outdoor-air volume percentage α;

(d) deriving a linear function which expresses a relation between the outdoor-air temperature To and the mixed-air temperature Tm for each level of the outdoor-air volume percentage α by using the return-air temperature Tr and the total heat-exchange efficiency η; and (e) deciding that in the range where the mixed-air temperature Tm is lower than the supply-air temperature Ts for each of the linear functions within the range of the outdoor-air temperature To in a summer season S, the range where the mixed-air temperature Tm in each linear function comes closest to the supply-air temperature Ts as compared with the mixed-air temperatures Tm in the other linear functions is a setting retention range (S1, S2) where the setting of the outdoor-air volume percentage α in the corresponding linear function is retained.

In any of the above aspects, it is preferable that the air conditioner is controlled by allowing each of the setting retention ranges to correspond to a practical period in units of months or days, and during the practical period, retaining the setting of the total heat-exchange efficiency η and the outdoor-air volume percentage α for the corresponding setting retention range.

Advantages of the Present Invention

The air conditioner controlling method according to the present invention is characterized by having the process of deciding on set values of the total heat-exchange efficiency and the outdoor-air volume percentage for each of the four seasons. The total heat-exchange efficiency is set to zero or a specified value for each season. The outdoor-air volume percentage is firstly set to two or more stepped numerical values selected for each season, and using a linear function which expresses a relation between the outdoor-air temperature and the mixed-air temperature for each numerical value, a decision is made on an outdoor-air temperature range in which the numerical values are retained so that the mixed-air temperature comes as close as possible to the specified supply-air temperature. This dispenses with chilled water and reduces the consumption of hot water in the neutral and winter seasons, and reduces the consumption of chilled water in the summer season. According to the present invention, the consumption of heat for hot water and chilled water throughout the year can be reduced, thereby saving energy.

Further areas of applicability of the present invention will become apparent from the detailed description provided hereinafter. It should be understood that the detailed description and specific examples, while indicating the preferred embodiment of the present invention, are intended for purposes of illustration only and are not intended to limit the scope of the present invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a graphical presentation showing the process of setting the total heat-exchange efficiency η and the outdoor-air volume percentage α in a winter season W according to the present invention, using linear functions for the outdoor-air temperature To and the mixed-air temperature Tm;

FIG. 6 is a graphical presentation showing the process of setting the total heat-exchange efficiency η and the outdoor-air volume percentage α in the summer season S according to the present invention, using linear functions for the outdoor-air temperature To and the mixed-air temperature Tm;

FIG. 7 is a table showing, in the example of the settings of the total heat-exchange efficiency and the outdoor-air volume percentage for the individual seasons which is indicated in FIGS. 4, 5 and 6, an application example of the correspondence of practical periods to the individual setting retention periods in the individual seasons;

FIG. 9 is a flow chart schematically showing a flow of the controlling method in the summer season.

The same reference numerals refer to the same parts throughout the various Figures.

DETAILED DESCRIPTION OF THE INVENTION

The following description of the preferred embodiment(s) is merely exemplary in nature and is in no way intended to limit the present invention, or uses.

(1) Summary of the System Configuration

Figure 1:
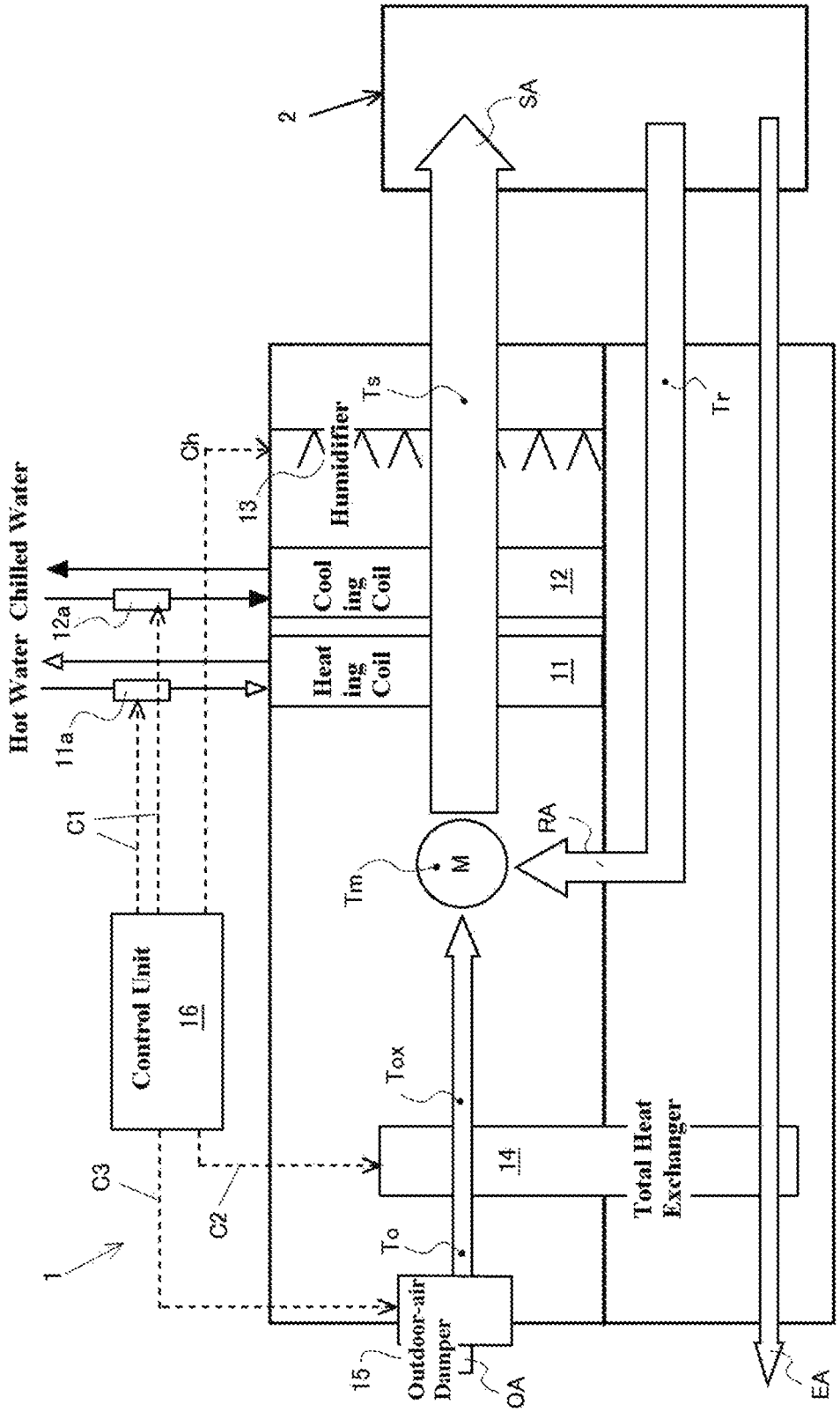
FIG. 1 is a block diagram schematically illustrating the whole configuration of an air-conditioning system to which the application is made of an air conditioner controlling method according to the present invention.

FIG. 1 is a block diagram schematically illustrating the whole configuration of an air-conditioning system to which the application is made of an air conditioner controlling method according to the present invention. The present invention is applied to an air conditioner in a central air-conditioning system.

In a central air-conditioning system, an air conditioner 1 is also called an air handling unit and is basically provided in individual buildings. An interior zone 2 is a typical one of individual rooms to be air-conditioned inside of a building. Into the air conditioner 1, outdoor air OA is sent from an outdoor-air damper 15 and is mixed with return air RA from the interior zone 2 to form mixed air M. The mixed air M is, if necessary, heated or cooled through a heat exchange when flowing through a heating coil 11 or a cooling coil 12, respectively.

The air conditioner 1 is supplied with hot water and chilled water as a heat source, and the hot water and chilled water can be produced in each building itself, or alternatively, can be supplied from a heating/cooling plant in a particular district, the heating/cooling plant supplying several buildings therewith. After heated or cooled, the mixed air M is, additionally if necessary, humidified by a humidifier 13, and is sent as supply air SA to the interior zone 2. The air which returns from the interior zone 2 to the air conditioner 1 is return air RA and exhaust air EA. The exhaust air EA, separately from the return air RA, flows through a total heat exchanger 14, makes a total heat exchange with the outdoor air OA if necessary and thereafter is exhausted.

The air conditioner 1 includes a control unit 16 controlling the pieces of internal equipment described above. In FIG. 1, the dotted lines illustrate main control flows executed by the control unit 16. In the air-conditioning design, a specified supply-air temperature Ts is set, and the specified supply-air temperature Ts is maintained by controlling a hot-water quantity regulation valve 11a of the heating coil 11 or a chilled-water quantity regulation valve 12a of the cooling coil 12 (indicated by a dotted line C1). Further, in the air-conditioning design, a specified indoor relative humidity is also set, and the humidifier 13 is controlled so that the humidity of the supply air SA can be controlled (indicated by a dotted line Ch). Still further, the control of the total heat exchanger 14 on whether it is in operation or stopped (indicated by a dotted line C2) and the control of the outdoor-air damper 15 on the degree of opening (indicated by a dotted line C3) are also executed. These controls are general controlling methods, and hence, a detailed description thereof is omitted.

The controlling method according to the present invention is characterized by having the process of setting a total heat-exchange efficiency η obtained by the total heat exchanger 14 and an outdoor-air volume percentage α equivalent to the ratio of the outdoor air OA in the supply air SA for each of the four seasons.

The total heat-exchange efficiency η is basically controlled by two values, specifically, whether the total heat exchanger 14 is in operation (the specified value TO or stopped (zero). The numerical value of the total heat-exchange efficiency η is ordinarily determined by the total heat exchanger 14, for example, 50%. After undergoing a total heat exchange, an outdoor-air temperature (Tox) is expressed in [Expression 1] described later. When the total heat exchanger 14 is stopped, the outdoor-air temperature Tox is equal to an outdoor-air temperature To.

The outdoor-air volume percentage α is mainly controlled by the degree of opening of the outdoor-air damper 15. In the air-conditioning design, a volume Qs of the supply air SA is set to a specified value and is constantly retained at the value. As the outdoor-air volume percentage α increases, a volume Qo of the outdoor air OA in the supply air SA increases while a volume Qr of the return air RA therein decreases (by this decreased volume, the volume of the exhaust air EA increases). The relation of a (%), Qs, Qo and Qr is as follows:

$$Qs(\text{constant})=Qo+Qr.$$

$$\alpha/100=Qo/Qs.$$

The outdoor-air volume percentage α is regulated, and thereby, a mixed-air temperature Tm is regulated. A calculation expression of the mixed-air temperature Tm is expressed in [Expression 2] described later.

(2) Basic Description of the Controlling Method

First, the fundamental principle set forth as a premise of the controlling method according to the present invention will be described before the controlling method itself is described. At the same time, a description will be given of some problems of conventional controlling methods which may be easily caused in the neutral (spring and autumn) seasons and the winter season.

In an example, conventional design conditions are utilized under which a general air conditioner operates in the neutral seasons and the winter season. In conventional ordinary control, a total heat exchanger is constantly in operation (the total heat-exchange efficiency η is constant) throughout the neutral seasons and the winter season, and simultaneously, the outdoor-air volume percentage α is always constant. The supply-air temperature Ts is a specified design value. A return-air temperature (indoor temperature) Tr is experientially approximately the supply-air temperature Ts+2° C. in the neutral seasons and the winter season, and this value is determined as the design value (however, unrestricted to this value). The basics of control is to control hot water and chilled water so that the supply-air temperature Ts is equal to the design value.

<Conventional Design Conditions in the Neutral and Winter Seasons>

Supply-air temperature Ts: 20° C. (design value)
Return-air temperature (=Indoor temperature) Tr: 22° C. (design value)
Total heat-exchange efficiency η: 50% (constant)
Outdoor-air volume percentage α: 33% (constant)

Figure 2:
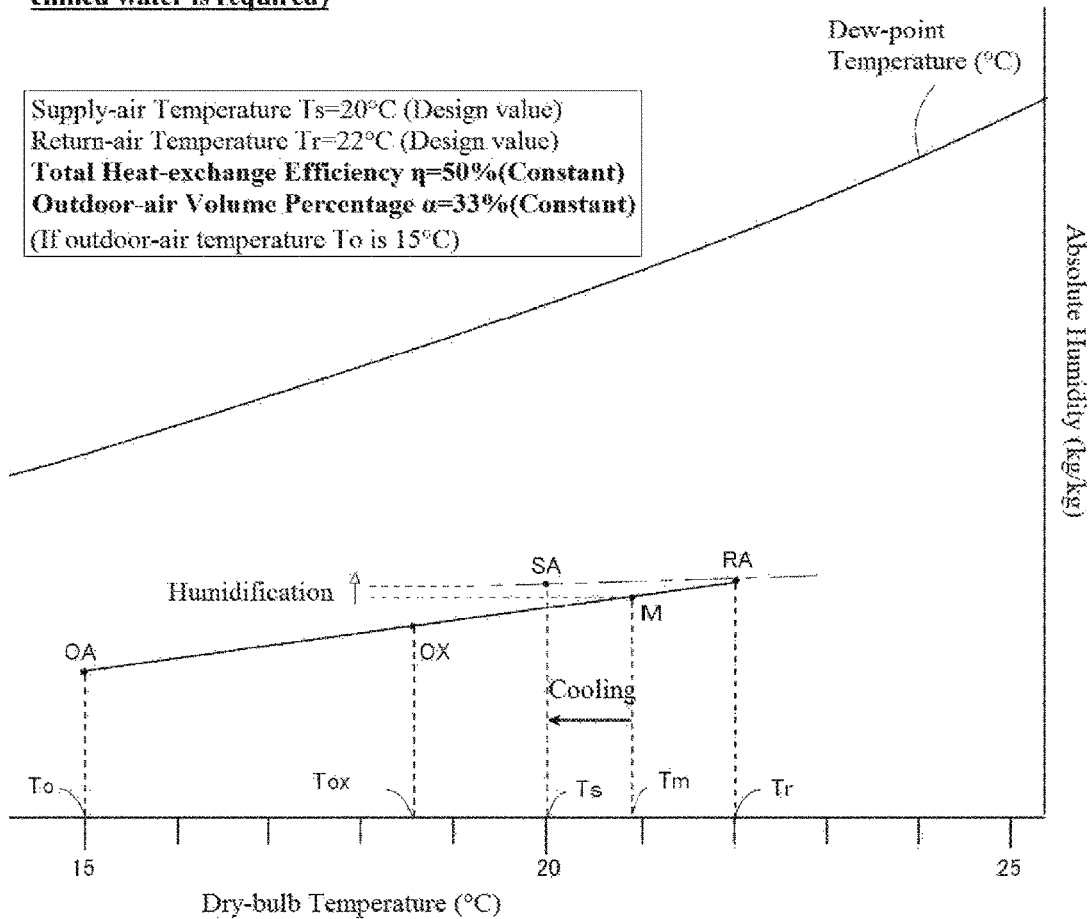
FIG. 2 is a graphical presentation showing an example of the control of an air conditioner under predetermined design conditions which is expressed on a psychrometric chart.

FIG. 2 is a graphical presentation showing an example of the control of an air conditioner under the above design conditions which is expressed on a psychrometric chart. In this example, the outdoor-air temperature To is 15° C. and the values of the outdoor air OA and the return air RA are indicated in the figure. The supply air SA is identical to the intersection point of the line parallel to the sensible-heat factor line SHF (not shown) through the point of the return air RA and the line of the design value 20° C. of the supply-air temperature Ts. An outdoor air OX subjected to a total heat exchange is on the straight line joining the points RA and OA. The temperature Tox of the outdoor air OX subjected to a total heat exchange is calculated in the following [Expression 1], and in this case, it is 18.5° C.

Calculation expression for the outdoor-air temperature Tox subjected to a total heat exchange:

$$Tox=To+(Tr-To)\eta'(\text{on condition that } \eta'=\eta/100). \quad [\text{Expression 1}]$$

Then, the outdoor air OX subjected to a total heat exchange is mixed with the return air RA at the outdoor-air volume percentage α, and the mixed air M is on the straight line joining the points RA and OX. The mixed-air temperature Tm is calculated in the following [Expression 2], and in this case, it is 20.85° C.

Calculation expression for the mixed-air temperature Tm:

$$Tm=Tr-(Tr-Tox)\alpha'(\text{on condition that } \alpha'=\alpha/100). \quad [\text{Expression 2}]$$

In the example of FIG. 2, in order to lead the mixed air M to the supply air SA, the mixed air M needs cooling so that the mixed-air temperature Tm falls to the supply-air temperature Ts (indicated by the black arrow). Hence, the mixed air M makes a heat exchange with chilled water in a cooling coil. With respect to the humidity, a humidifier humidifies the mixed air M so that the humidity thereof rises to the humidity of the supply air SA (indicated by the white arrow). As described above, even in the neutral seasons, chilled water is utilized, thereby wasting energy. In practice, the return-air temperature Tr can be higher than the above design value, and hence, more chilled water may be utilized.

The mixed-air temperature Tm is directly involved in the consumption of chilled water or hot water, and hence, it is important to understand relations between the mixed-air temperature Tm and other such elements. Using the above [Expression 1] and [Expression 2], the mixed-air temperature Tm is expressed as the function of the outdoor-air temperature To in the following [Expression 3].

Relational expression between the outdoor-air temperature To and the mixed-air temperature Tm:

$$Tm=(1-\eta')\alpha'To+(1-(1-\eta)\alpha')Tr. \quad [\text{Expression 3}]$$

Particularly, when a total heat exchanger is stopped (η=0 (η'=0)), the mixed-air temperature Tm is expressed in the following [Expression 3A].

Relational expression between the outdoor-air temperature To and the mixed-air temperature Tm:

$$Tm=\alpha'To+(1-\alpha')Tr. \quad [\text{Expression 3A}]$$

The above [Expression 3] is a linear function in which the outdoor-air temperature To is the variable of x, the mixed-air temperature Tm is the variable of y, the slope is (1−η)α' and the intercept is (1−(1−η)α') Tr ([Expression 3A] is also the same). Hence, the relation between the outdoor-air temperature To and the mixed-air temperature Tm is expressed by a straight line on the xy-plane.

The linear function of [Expression 3] is characterized in that the slope and the intercept change if the constants η' and α' (i.e., η and α) change, and the straight line on the xy-plane necessarily passes through the point of x=Tr and y=Tr. In neutral seasons N and a winter season W, in design, the range of the outdoor-air temperature To is expected to be lower than that of the return-air temperature Tr (22° C. in the neutral and winter seasons). Hence, within the range of the outdoor-air temperature To in the neutral seasons N and the winter season W, the individual straight lines which differ in η and a do not intersect each other ([Expression 3A] is also the same). This fact realizes the process of deciding on the outdoor-air volume percentage α according to the present invention in the neutral seasons N and the winter season W (described later).

Figure 3:
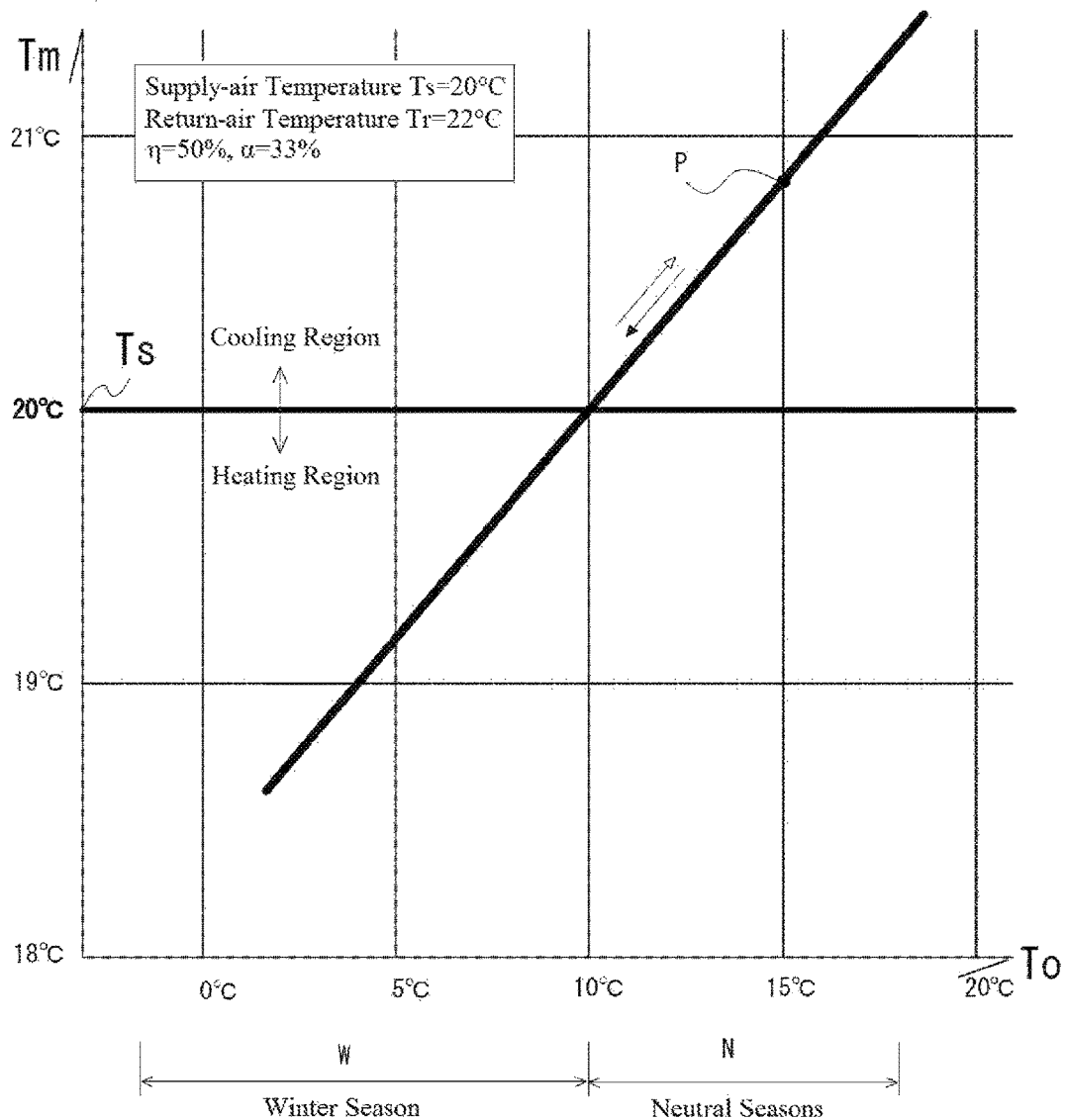
FIG. 3 is a graphical presentation showing that the constants of Tr, η and α of [Expression 3] are set to numerical values under predetermined design conditions, and an outdoor-air temperature To and a mixed-air temperature Tm are variables for the x-axis and the y-axis, respectively.

FIG. 3 is a graphical presentation showing a linear function of the outdoor-air temperature To (the x-axis) and the mixed-air temperature Tm (the y-axis) when the constants of Tr, η and α of the above [Expression 3] are set to numerical values under the above design conditions. The point P corresponds to the case where the outdoor-air temperature To is 15° C. in FIG. 2. The range where the mixed-air temperature Tm is lower than the supply-air temperature Ts is a range where heating by hot water is required, and this is named the "heating region." On the other hand, the range where the mixed-air temperature Tm is higher than the supply-air temperature Ts is a range where cooling by chilled water is required, and this is named the "cooling region."

In FIG. 3, the above linear function of [Expression 3] intersects with the supply-air temperature Ts, and at the intersection point, the outdoor-air temperature To is 10° C., which is set for convenience as the boundary between the winter season W and the neutral seasons N. Conventionally, throughout the winter season W and the neutral seasons N, both the total heat-exchange efficiency η and the outdoor-air volume percentage α are retained at a specified value, and hence, the outdoor-air temperature To and the mixed-air temperature Tm change along the straight line of the linear function. The white arrow and the black arrow along the straight line indicate changes in the mixed-air temperature Tm as the outdoor-air temperature To goes up and down, respectively (the same in the following similar figures). Accordingly, the lower the outdoor-air temperature To becomes below 10° C., the larger the hot-water consumption for heating becomes. On the other hand, the higher the outdoor-air temperature To becomes above 10° C., the larger the chilled-water consumption for cooling becomes.

In the case where the outdoor-air temperature To is 15° C., using the above [Expression 3], the values of the total heat-exchange efficiency η and the outdoor-air volume percentage α are calculated to obtain an ideal condition of Tm=Ts. Two examples will be below described in which the total heat-exchange efficiency η is 50% and 0%.

<Example 1> Total Heat-Exchange Efficiency η=50%

In the above [Expression 3], if Tm=20° C. (=Ts), η=0.5, To=15° C. and Tr=22° C., then α'=0.57, meaning that the outdoor-air volume percentage α is 57%.

<Example 2> Total Heat-Exchange Efficiency η=0%

In the above [Expression 3], if Tm=20° C. (=Ts), η=0, To=15° C. and Tr=22° C., then α'=0.29, meaning that the outdoor-air volume percentage α is 29%.

Judging from these examples, if the outdoor-air volume percentage α is adjusted to 57% or 29%, then heating and cooling are unnecessary, so that the most energy-saving control can be realized. However, as described above, it is practically difficult to freely regulate the degree of opening of an outdoor-air damper and thereby continuously control the outdoor-air volume percentage α so that it becomes desired values. Especially, it would be impossible to control an existing system in the above manner.

(3) Controlling Method in the Neutral Seasons According to the Present Invention The present invention provides an air conditioner controlling method for setting the outdoor-air volume percentage α to not continuous values but two or more stepped levels. Even in an outdoor-air damper used at present, the degree of opening thereof can be controlled by approximately two or three steps. According to the present invention, in each of the three kinds of seasons, e.g., the neutral season (spring/autumn), the winter season and the summer season, control is executed under predetermined design conditions for the individual seasons. First, a description will be given of a controlling method for the neutral season.

Figure 4:
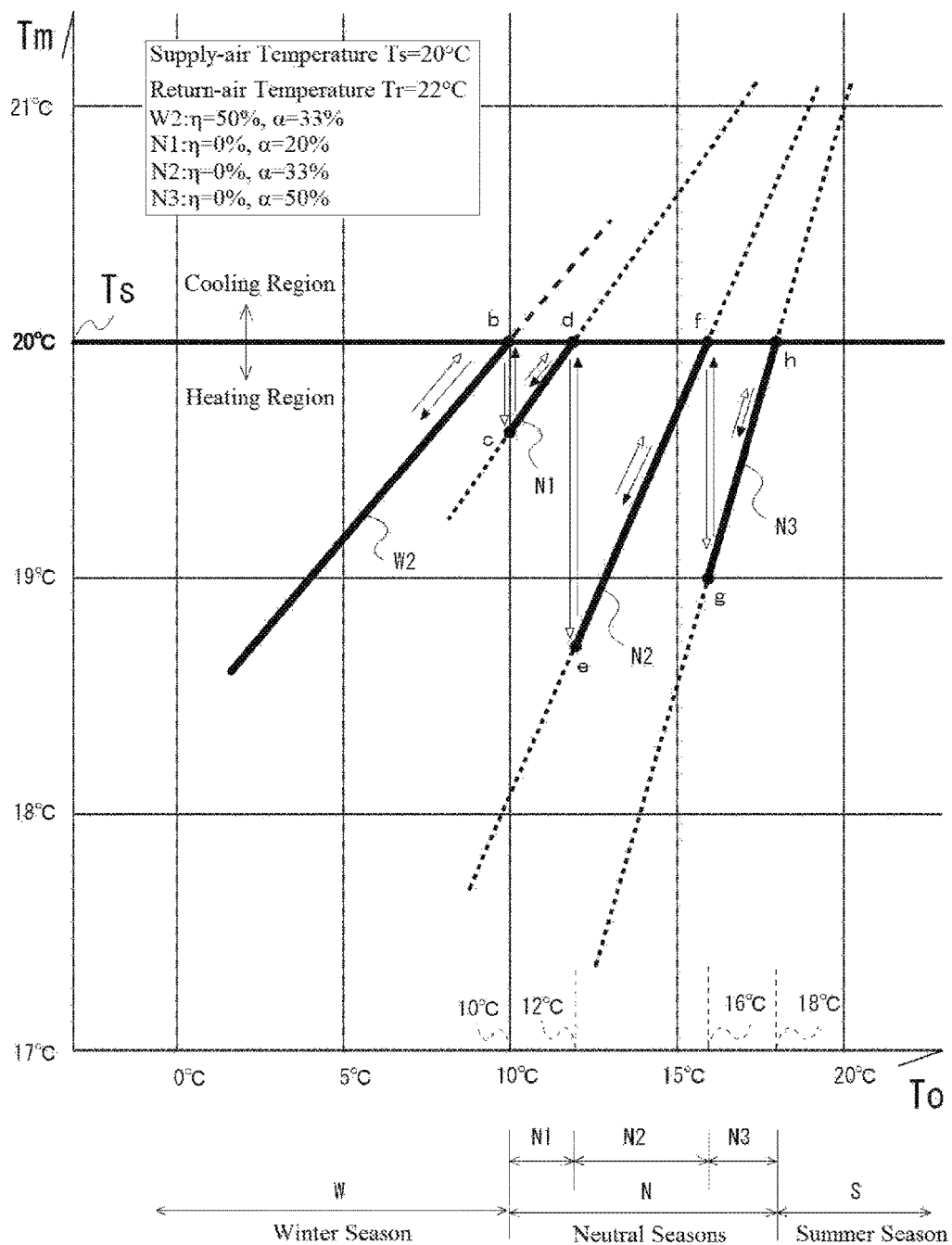
FIG. 4 is a graphical presentation showing the process of setting a total heat-exchange efficiency η and an outdoor-air volume percentage α in neutral seasons N according to the present invention, using linear functions for the outdoor-air temperature To and the mixed-air temperature Tm.

FIG. 4 is a graphical presentation showing the process of deciding on the total heat-exchange efficiency η and the outdoor-air volume percentage α in the neutral seasons N according to the present invention, using linear functions for the outdoor-air temperature To and the mixed-air temperature Tm. For reference, the figure also shows a part of the winter season W. The range of the outdoor-air temperature To for each season is experientially set as a tentative one. There is no need to strictly determine boundary values of the outdoor-air temperature To on the high-temperature side and on the low-temperature side in the neutral seasons N, a boundary value of the outdoor-air temperature To on the high-temperature side in the winter season W and a boundary value of the outdoor-air temperature To on the low-temperature side in the summer season S. In the example shown in the figure, the outdoor-air temperature To continues from the neutral seasons N to the winter season W, but as the seasonal transitional period, another outdoor-air temperature range may be set between both outdoor-air temperature ranges. During the transitional period, a different controlling method can be applied (the boundary between the summer season S (described later) and the neutral seasons N is also the same).

According to the present invention, the total heat-exchange efficiency η is set to zero or a specified value for each of the neutral season (spring/autumn), the winter season and the summer season. As the total heat-exchange efficiency η, only the two values are generally chosen and an experientially preferred value should be simply fixed. In the neutral seasons N, the total heat exchanger 14 is stopped, meaning that the total heat-exchange efficiency η is zero. In consideration of the range of the outdoor-air temperature To in the neutral seasons N, the heat exchange of the outdoor air with the return air is substantially dispensable.

The outdoor-air volume percentage α is set by changing two or more stepped levels within the range of the outdoor-air temperature To in each season. First, numerical values corresponding to the two or more stepped levels are chosen, and in the example of the figure, the outdoor-air volume percentage α is changed by three stepped levels within the range of the outdoor-air temperature To in the neutral seasons N. In an example, the three stepped levels are 20%, 33% and 50%.

Next, the three stepped levels of the outdoor-air volume percentage α are applied to the corresponding portions of the range of the outdoor-air temperature To, respectively. After the levels are applied, within the individual portions in the outdoor-air temperature To, the outdoor-air volume percentage α is retained at the specified values (naturally, the total heat-exchange efficiency η is also retained at the specified value thereof). In the present specification, the individual range portions of the outdoor-air temperature To are named "setting retention ranges."

In order to decide on each setting retention range in the neutral seasons N, first, a linear function of the outdoor-air temperature To and the mixed-air temperature Tm in the above [Expression 3A] is derived for each level of the outdoor-air volume percentage α. The design conditions in the neutral seasons are the same as the above, as follows:

Supply-air temperature Ts: 20° C. (design value)
Return-air temperature (=Indoor temperature) Tr: 22° C. (design value).

The linear function for each level of the outdoor-air volume percentage α is as follows:

If η=0% and α is 20% (N1 in FIG. 4),
Tm=0.2To+17.6
If η=0% and α is 33% (N2 in FIG. 4),
Tm=0.33To+14.74
If η=0% and α is 50% (N3 in FIG. 4),
Tm=0.5To+11.

The linear functions for the individual levels of the outdoor-air volume percentage α are straight lines N1, N2 and N3 in FIG. 4, respectively (hereinafter, the reference characters and numerals N1, N2 and N3 can denote the linear functions or the straight lines, or can denote the setting retention ranges of the outdoor-air temperature To corresponding to the linear functions).

Next, within the range of the outdoor-air temperature To in the neutral seasons N, a decision is made on the individual setting retention ranges corresponding to the three levels. First, in each of the linear functions, the range where the mixed-air temperature Tm is lower than the supply-air temperature Ts, in other words, the heating region (Tm<Ts) is used as the target. Then, the range is found where the mixed-air temperature Tm in each linear function comes closest to the supply-air temperature Ts as compared with those in the other linear functions. Within this range, the setting of the outdoor-air volume percentage α of the corresponding linear function is retained, and hence, each such range is set as the setting retention range N1, N2, N3.

When the outdoor-air temperature To is 10-12° C., all of the straight lines are in the heating region, but the straight line N1 is closest to Ts. This is set as the setting retention range N1 where the outdoor-air volume percentage α is 20%. Within the setting retention range N1, the outdoor-air volume percentage 20% is retained, and thereby, the consumption of hot water becomes smallest (between the point c and the point d of FIG. 4) as compared with the cases in which the other outdoor-air volume percentages are set. In this example, the boundary value on the low-temperature side in the neutral seasons N is 10° C., but the decision on the boundary value on the low-temperature side is not directly involved in the method according to the present invention.

If the outdoor-air temperature To exceeds 12° C., the straight line N1 comes into the cooling region and is removed from the target. When the outdoor-air temperature To is 12-16° C., the straight lines N1 and N2 are in the heating region, but the straight line N2 is closest to the supply-air temperature Ts. This is set as the setting retention range N2 where the outdoor-air volume percentage α is 33%. Hence, if the outdoor-air temperature To reaches 12° C., then the outdoor-air volume percentage α is changed to 33% for the straight line N2 (between the point d and the point e of FIG. 4). Within the setting retention range N2, the outdoor-air volume percentage 33% is retained, and thereby, the consumption of hot water becomes smallest (between the point e and the point f of FIG. 4) as compared with the cases in which the other outdoor-air volume percentages are set.

If the outdoor-air temperature To exceeds 16° C., the straight line N2 alike comes into the cooling region and is removed from the target. When the outdoor-air temperature To is 16-18° C., only the straight line N3 is in the heating region. This is set as the setting retention range N3 where the outdoor-air volume percentage α is 50%. Hence, if the outdoor-air temperature To reaches 16° C., then the outdoor-air volume percentage α is changed to 50% for the straight line N3 (between the point f and the point g of FIG. 4). Within the setting retention range N3, the outdoor-air volume percentage 50% is retained, and thereby, the consumption of hot water becomes smallest (between the point g and the point h of FIG. 4).

If the outdoor-air temperature To exceeds 18° C., the straight line N3 alike comes into the cooling region. In the range where the outdoor-air temperature To is higher than this, control is executed under other design conditions in the summer season S (or an optional transitional period). In this example, therefore, the outdoor-air temperature 18° C. is determined as the boundary value on the high-temperature side in the neutral seasons N.

On the other hand, if the autumn season arrives after the summer season and the outdoor-air temperature To goes down, then when the outdoor-air temperature To falls to 18° C., the control for the summer season S (or an optional transitional period) is changed to the control for the neutral seasons N. Through a process opposite to the above, as the outdoor-air temperature To goes down, the outdoor-air volume percentage α is successively changed from 50% for the setting retention range N3 through 33% for the setting retention range N2 to 20% for the setting retention range N1.

As described above, in the neutral seasons N, the outdoor-air volume percentage α is changed step by step in accordance with the setting retention ranges N1, N2 and N3 provided with the three levels of the outdoor-air temperature To. This dispenses with chilled water and significantly reduces the hot-water consumption as compared with the case of FIG. 3 where the same outdoor-air volume percentage is retained throughout the neutral seasons N.

FIG. 4 shows a straight line W2 for the winter season W, which is similar to the straight line of FIG. 3. If the outdoor-air temperature To exceeds 10° C., then the straight line W2 comes into the cooling region (Tm>Ts) where chilled water needs utilizing. In contrast, the three straight lines for the neutral seasons N are in the heating region (Tm<Ts), even though the outdoor-air temperature To is equal to or more than 10° C. Hence, in this example, To=10° C. is set as the boundary between the winter season W and the neutral seasons N. Specifically, if the outdoor-air temperature To exceeds 10° C., then the control of the winter season W is changed to the control of the neutral season N (between the point b and the point c of FIG. 4: the seasonal transition from the winter to the spring). Conversely, if the outdoor-air temperature To becomes equal to or less than 10° C., then the control of the neutral season N is changed to the control of the winter season W (between the point c and the point b of FIG. 4: the seasonal transition from the autumn to the winter).

(4) Controlling Method in the Winter Season According to the Present Invention

FIG. 5 is a graphical presentation showing the process of deciding on the total heat-exchange efficiency η and the outdoor-air volume percentage α in the winter season W according to the present invention, using linear functions for the outdoor-air temperature To and the mixed-air temperature Tm. For reference, the figure also shows a part of the neutral seasons N shown in FIG. 4.

In the winter season W, the total heat exchanger 14 is in operation (lest high-temperature return air should be wasted). Hence, the total heat-exchange efficiency $\eta$ is retained at a specified value and is 50% in an example.

The outdoor-air volume percentage $\alpha$ is controlled using two stepped levels in an example, and as those numerical values, 20% and 33% are selected in this example.

Next, a linear function of the outdoor-air temperature To and the mixed-air temperature Tm in the above [Expression 3] is derived for each of the two levels of the outdoor-air volume percentage $\alpha$. The design conditions in the winter season W are the same as those of the neutral seasons N, as follows:

Supply-air temperature Ts: 20° C. (design value)
Return-air temperature (=Indoor temperature) Tr: 22° C. (design value).

The linear function for each level of the outdoor-air volume percentage $\alpha$ is as follows:

If $\eta$=50% and $\alpha$ is 20% (W1 in FIG. 5),
Tm=0.1To+19.8
If $\eta$=50% and $\alpha$ is 33% (W2 in FIG. 5),
Tm=0.165To+18.37

The straight lines of the linear functions for the individual levels of the outdoor-air volume percentage $\alpha$ are W1 and W2 in FIG. 5, respectively (hereinafter, the reference characters and numerals W1 and W2 can denote the linear functions or the straight lines, or can denote the setting retention ranges of the outdoor-air temperature To corresponding to the linear functions).

Next, within the winter season W, a decision is made on the individual setting retention ranges corresponding to the two levels. This decision is made by the same method as the above method of the neutral seasons N. First, in each of the linear functions, the range where the mixed-air temperature Tm is lower than the supply-air temperature Ts, in other words, the heating region (Tm<Ts) is used as the target. Then, the range is found where the mixed-air temperature Tm in each linear function comes closest to the supply-air temperature Ts as compared with those in the other linear functions. Within this range, the setting of the outdoor-air volume percentage $\alpha$ of the corresponding linear function is retained, and hence, each such range is set as the setting retention range W1, W2.

When the outdoor-air temperature To is below 2° C., both of the straight lines W1 and W2 are in the heating region, but the straight line W1 is closer to Ts. This is set as the setting retention range W1. Within the setting retention range W1, the outdoor-air volume percentage 20% is retained, and thereby, the consumption of hot water becomes smallest (between the point p and the point q of FIG. 6: however, the point q on the low-temperature side is not a particular point).

When the outdoor-air temperature To is 2-10° C., only the straight line W2 is in the heating region. This is set as the setting retention range W2. Hence, if the outdoor-air temperature To reaches 2° C., then the outdoor-air volume percentage $\alpha$ is changed from the percentage for the straight line W1 to 33% for the straight line W2 (between the point p and the point a of FIG. 5). Within the setting retention range W2, the outdoor-air volume percentage 33% is retained, and thereby, the consumption of hot water becomes smallest (between the point a and the point b of FIG. 5).

Although the straight line N1 of the neutral seasons N of FIG. 5 is the same as that of FIG. 4, if the outdoor-air temperature To falls below 10° C., then the mixed-air temperature Tm of the straight line W2 in the winter season W is closer to Ts than that of the straight line N1. Hence, if the outdoor-air temperature To falls below 10° C., then the control of the neutral season N is changed to the control of the winter season W (between the point c and the point b of FIG. 5: the seasonal transition from the autumn to the winter).

(5) Controlling Method in the Summer Season According to the Present Invention

FIG. 6 is a graphical presentation showing the process of deciding on the total heat-exchange efficiency $\eta$ and the outdoor-air volume percentage $\alpha$ in the summer season S according to the present invention, using linear functions for the outdoor-air temperature To and the mixed-air temperature Tm.

In the summer season S, the total heat exchanger 14 is in operation (lest low-temperature return air should be wasted). Hence, the total heat-exchange efficiency $\eta$ is retained at a specified value and is 50% in an example.

The outdoor-air volume percentage $\alpha$ is controlled using two stepped levels in an example, and as those numerical values, 33% and 20% are selected in this example.

Next, a linear function of the outdoor-air temperature To and the mixed-air temperature Tm in the above [Expression 3] is derived for each of the two levels of the outdoor-air volume percentage $\alpha$. The design conditions in the summer season S are as follows:

Supply-air temperature Ts: 14° C. (design value)
Return-air temperature (=Indoor temperature) Tr: 26° C. (design value).

The linear function for each level of the outdoor-air volume percentage $\alpha$ is as follows:

If $\eta$=50% and $\alpha$ is 33% (S1 in FIG. 6),
Tm=0.165To+21.71
If $\eta$=50% and $\alpha$ is 33% (S2 in FIG. 6),
Tm=0.1To+23.4

The straight lines of the linear functions for the individual levels of the outdoor-air volume percentage $\alpha$ are S1 and S2 in FIG. 6, respectively (hereinafter, the reference characters and numerals S1 and S2 can denote the linear functions or the straight lines, or can denote the setting retention ranges of the outdoor-air temperature To corresponding to the linear functions).

Next, within the summer season S, a decision is made on the individual setting retention ranges. In the summer season S, both of the straight lines are in the cooling region where only chilled water is utilized. Hence, in each of the linear functions, the range where the mixed-air temperature Tm is higher than the supply-air temperature Ts, in other words, the cooling region (Tm>Ts) is used as the target. Then, the range is found where the mixed-air temperature Tm in each linear function comes closest to the supply-air temperature Ts as compared with those in the other linear functions. Within this range, the setting of the outdoor-air volume percentage $\alpha$ of the corresponding linear function is retained, and hence, each such range is set as the setting retention range S1, S2.

When the outdoor-air temperature To is 18-26° C., the mixed-air temperature Tm of the straight line S1 is closer to Ts and is set as the setting retention range S1. Within the setting retention range S1, the outdoor-air volume percentage 33% is retained (between the point i and the point j of FIG. 6).

When the outdoor-air temperature To exceeds 26° C., the mixed-air temperature Tm of the straight line S2 is closer to Ts and is set as the setting retention range S2. Hence, if the outdoor-air temperature To reaches 26° C., then the outdoor-air volume percentage $\alpha$ is changed to 20% (the point j). Within the setting retention range S2, the outdoor-air volume percentage 20% is retained, and thereby, the consumption of chilled water is reduced (between the point j and the point k of FIG. 6: however, the point k on the high-temperature side is not a particular point).

In FIG. 6, when the outdoor-air temperature To is 18° C., this temperature is set as the boundary between the neutral seasons N and the summer season S. However, the neutral seasons N differ largely in design conditions from the summer season S, and in practice, it would be desirable to arrange a specified transitional period between those seasons. Such a transitional period is not the target of the present invention, and hence, description thereof is omitted.

(6) How to Apply the Controlling Method According to the Present Invention

In the controlling method according to the present invention, the outdoor-air temperature To is used in the above process of deciding on the outdoor-air volume percentage α. This outdoor-air temperature To is an outdoor-air temperature given in design. As a matter of course, the outdoor-air temperature To practically varies within a single day, and the average temperature thereof may not necessarily rise or fall monotonously day by day. Similarly, the return-air temperature Tr may not necessarily vary in accordance with the design. Accordingly, even if the mixed-air temperature Tm is designed as described above to stay in the heating region in the neutral seasons or the winter season, then in practice, chilled water may be utilized for some hours within a day, or more chilled water may be utilized on some days than hot water. However, the outdoor-air temperature To in design is expected to correspond substantially to an average outdoor-air temperature in the daytime at an office building. Therefore, the aspect of the utilization of chilled water and hot water which is targeted by the present invention can be realized on average through one day or several days. This was verified by tests done through a year in real buildings.

In the controlling method according to the present invention, as described above, setting retention ranges for the outdoor-air volume percentage α are determined, and afterward, practical periods are set so as to correspond to the individual setting retention ranges. Specifically, predetermined practical periods in units of months or days correspond to the individual setting retention ranges of the winter season W, the neutral seasons N and the summer season S in design. Thereafter, during the individual practical periods, the air conditioner 1 is controlled in accordance with the setting values for the setting retention ranges corresponding thereto. In this manner, the control is executed, and thereby, especially as for the setting for the neutral seasons N, the chilled water/hot-water consumption can be largely reduced as compared with the conventional control executed using the same setting as those for the winter season W and the summer season S.

In the case of the neutral seasons N shown in FIG. 4, the first, second and third setting retention ranges N1, N2 and N3 correspond to the settings for the three stepped levels of the outdoor-air volume percentage α, respectively. Then, the practical periods in units of months or days are set so as to correspond to the individual setting retention ranges N1, N2 and N3. Within the individual periods, the air conditioner 1 is controlled while retaining the individual setting values corresponding thereto. The control is executed in this manner, and thereby, the chilled water/hot-water consumption can be largely reduced as compared with the case where the same outdoor-air volume percentage is retained throughout the whole neutral seasons N.

Similarly in the case of the winter season W shown in FIG. 5, the setting retention ranges W1 and W2 correspond to the settings for the two stepped levels of the outdoor-air volume percentage α, respectively. Then, the practical periods in units of months or days are set so as to correspond to the individual setting retention ranges W1 and W2. Within the individual periods, the air conditioner 1 is controlled while retaining the individual setting values corresponding thereto. The control is executed in this manner, and thereby, the chilled water/hot-water consumption can be largely reduced as compared with the case where the same outdoor-air volume percentage is retained throughout the whole winter season W.

Similarly in the case of the summer season S shown in FIG. 6, the setting retention ranges S1 and S2 correspond to the settings for the two stepped levels of the outdoor-air volume percentage α, respectively. Then, the practical periods in units of months or days are set so as to correspond to the individual setting retention ranges S1 and S2. Within the individual periods, the air conditioner 1 is controlled while retaining the individual setting values corresponding thereto. The control is executed in this manner, and thereby, the chilled water consumption can be largely reduced as compared with the case where the same outdoor-air volume percentage is retained throughout the whole summer season S.

FIG. 7 is a table showing, in the example of the settings of the total heat-exchange efficiency η and the outdoor-air volume percentage α for the individual seasons which is indicated in FIGS. 4, 5 and 6, an application example of the correspondence of practical periods to the individual setting retention periods in the individual seasons. It is preferable that the practical periods are maximally identical to the corresponding ranges of the outdoor-air temperature To in design, on the basis of past outdoor-air temperature records for the individual practical periods, outdoor-air temperatures predicted by weather forecasts and the like, or experiential data. This correspondence is conducted from the perspective of air conditioner control and hence may differ from general seasonal divisions.

(7) Flow of the Air Conditioner Controlling Method

A summary explanation will be given of the flow of the air conditioner controlling method according to the present invention described above. The controlling method according to the present invention is applied to each of the four seasons independently.

Figure 8:
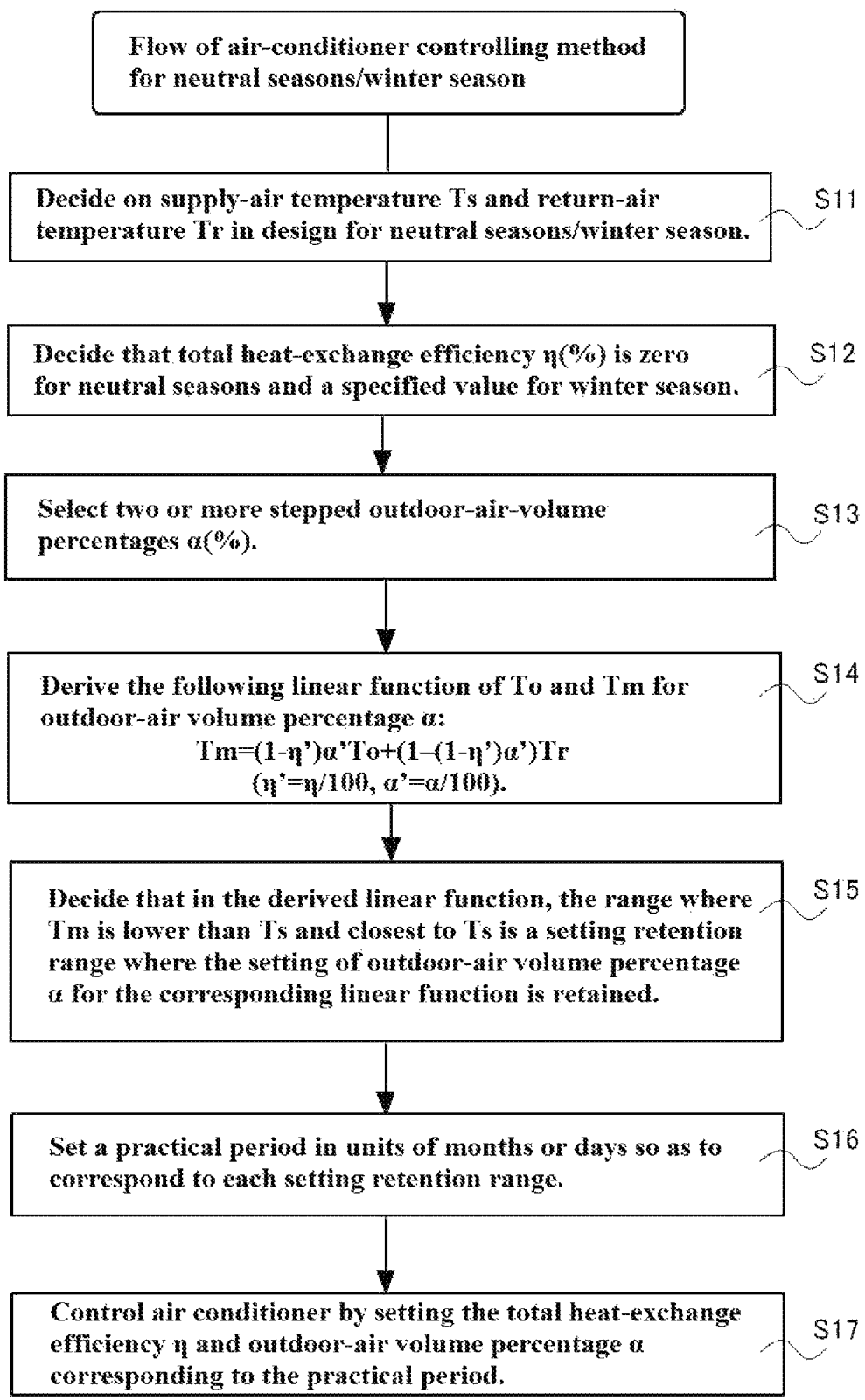
FIG. 8 is a flow chart schematically showing a flow of the controlling method in the neutral seasons or winter season.

FIG. 8 is a flow chart schematically showing a flow of the controlling method in the neutral seasons (or the winter season). First, the supply-air temperature Ts and the return-air temperature Tr in design are each determined for the neutral seasons (or the winter season) (in a step S11). Next, the total heat-exchange efficiency η is chosen from the two values of zero and a specified value (in a step S12). It is set to zero in the neutral seasons and a specified value in the winter season (e.g., 50%).

As the outdoor-air volume percentage α, numerical values indicating two or more stepped levels are selected (in a step S13). For example, three stepped levels: 20%, 33% and 50% are set for the neutral seasons. For the winter season, two stepped levels: 20% and 33% are set. However, the number of levels of the outdoor-air volume percentage α is not limited to two steps or three steps, and the numerical values for the levels are not limited to the numerical values given in the example.

Next, the numerical value determined as each level of the outdoor-air volume percentage α is used in the above [Expression 3] or [Expression 3A], and thereby, a linear function is derived in which the outdoor-air temperature To is the variable of x and the mixed-air temperature Tm is the variable of y (in a step S14).

In each of the linear functions derived for the individual levels of the outdoor-air volume percentage α, a decision is made on the range (heating region) where the mixed-air temperature Tm is lower than the supply-air temperature Ts and the range where the mixed-air temperature Tm in each linear function comes closest to the supply-air temperature Ts as compared with those in the other linear functions, and thereby, a decision is made on the setting retention ranges for the individual levels of the outdoor-air volume percentage α for the neutral seasons (or the winter season) (in a step S15). Therefore, within the whole range of the outdoor-air temperature To in the neutral seasons (or the winter season), the setting retention ranges are determined which are equal in number to the levels of the outdoor-air volume percentage α. The level of the outdoor-air volume percentage α corresponding to each linear function is retained within the single setting retention range.

In the above steps, within the range of the outdoor-air temperature To in design, a plurality of the setting retention ranges are determined, and then, practical periods in units of months or days are each set so as to correspond to the individual setting retention ranges (in a step S16).

During each of the practical periods, the total heat exchanger 14 and the outdoor-air damper 15 are adjusted so that the total heat-exchange efficiency η and the outdoor-air volume percentage α become equal to the values thereof for the setting retention range corresponding to the practical period and are retained at those values. During the corresponding period, the total heat-exchange efficiency η and the outdoor-air volume percentage α are constantly retained at the values, and the air conditioner control is executed utilizing hot water or chilled water (in a step S17). The outdoor-air volume percentage α is changed when the setting retention range transits from one range to another range. The total heat-exchange efficiency η and the outdoor-air volume percentage α are changed when the season transits from one season to the next season.

FIG. 9 is a flow chart schematically showing a flow of the controlling method in the summer season. In the chart, steps S21-S24 and steps S26-S27 are the same as the steps S11-S14 and the steps S16-S17 in the neutral seasons (or the winter season) shown in FIG. 8. In the summer season, the total heat-exchange efficiency η is set to a specified value (e.g., 50%).

In the summer season, in each of the linear functions for the individual levels of the outdoor-air volume percentage α, a range where the mixed-air temperature Tm is higher than the supply-air temperature Ts and a range where the mixed-air temperature Tm in each linear function comes closest to the supply-air temperature Ts as compared with those in the other linear functions are determined, and thereby, the setting retention ranges for the individual levels of the outdoor-air volume percentage α are each determined for the summer season (in a step S25).

DESCRIPTION OF THE SYMBOLS

1—air conditioner
2—interior zone
11—heating coil
12—cooling coil
13—humidifier
14—total heat exchanger
15—outdoor-air damper
16—control unit
To—outdoor-air temperature
Tox—outdoor-air temperature after total heat exchange
Tm—mixed-air temperature
Ts—supply-air temperature
Tr—return-air temperature
η—total heat-exchange efficiency
α—outdoor-air volume percentage
OA—outdoor air
SA—supply air
RA—return air
EA—exhaust air
M—mixed air
N—neutral seasons
N1, N2, N3—setting retention range in neutral seasons (linear function or its straight line for each outdoor-air volume percentage)
W—winter season
W1, W2—setting retention range in winter season (linear function or its straight line for each outdoor-air volume percentage)
S—summer season
S1, S2—setting retention range in summer season (linear function or its straight line for each outdoor-air volume percentage)

While the present invention has been described with reference to an exemplary embodiment, it will be understood by those skilled in the art that various changes can be made and equivalents can be substituted for elements thereof without departing from the scope of the present invention. In addition, many modifications can be made to adapt a particular situation or material to the teachings of the present invention without departing from the essential scope thereof. Therefore, it is intended that the present invention not be limited to the particular embodiment disclosed as the best mode contemplated for carrying out this invention, but that the present invention will include all embodiments falling within the scope of the appended claims.

What is claimed is:

1. An air conditioner controlling method for forming mixed air (M) by mixing outdoor air (OA) having a predetermined outdoor-air temperature (To) with return air (RA) having a predetermined return-air temperature (Tr) at a predetermined outdoor-air volume percentage (α), the outdoor air (OA) making a total heat exchange with exhaust air (EA) at a predetermined total heat-exchange efficiency (η), and if a mixed-air temperature (Tm) of the mixed air (M) differs from a specified supply-air temperature (Ts), then cooling or heating the mixed air (M) and sending supply air (SA) having the specified supply-air temperature (Ts), comprising the steps of:

in a process of deciding on the total heat-exchange efficiency (η) and the outdoor-air volume percentage (α) in neutral seasons (N), wherein the neutral seasons (N) include spring and autumn,
(a) deciding on the supply-air temperature (Ts) and the return-air temperature (Tr) as specified design values;
(b) deciding that the total heat-exchange efficiency (η) is zero;
(c) selecting two or more stepped levels of the outdoor-air volume percentage (α);
(d) deriving a linear function which expresses a relation between the outdoor-air temperature (To) and the mixed-air temperature (Tm) for each level of the outdoor-air volume percentage (α) by using the return-air temperature (Tr) and the total heat-exchange efficiency (η); and
(e) deciding that in a range where the mixed-air temperature (Tm) is lower than the supply-air temperature (Ts) for each of the linear functions within a range of the outdoor-air temperature (To) in the neutral seasons (N), the range where the mixed-air temperature (Tm) in each linear function is similar to the supply-air temperature (Ts) as compared with the mixed-air temperatures (Tm) in other linear functions is a setting retention range (N1, N2, N3) where setting of the outdoor-air volume percentage (α) in the corresponding linear function is retained;

wherein the air conditioner is controlled by allowing each of the setting retention ranges to correspond to a time period in units of months or days, and during the time period, retaining the setting of the total heat-exchange efficiency (η) and the outdoor-air volume percentage (α) for the corresponding setting retention range.

2. An air conditioner controlling method for forming mixed air (M) by mixing outdoor air (OA) having a predetermined outdoor-air temperature (To) with return air (RA) having a predetermined return-air temperature (Tr) at a predetermined outdoor-air volume percentage (α), the outdoor air (OA) making a total heat exchange with exhaust air (EA) at a predetermined total heat-exchange efficiency (η); and if a mixed-air temperature (Tm) of the mixed air (M) differs from a specified supply-air temperature (Ts), then cooling or heating the mixed air (M) and sending supply air (SA) having the specified supply-air temperature (Ts), comprising the steps of:

in a process of deciding on the total heat-exchange efficiency (η) and the outdoor-air volume percentage (α) in the winter season (W),
  (a) deciding on the supply-air temperature (Ts) and the return-air temperature (Tr) as specified design values;
  (b) deciding that the total heat-exchange efficiency (η) is a specified value;
  (c) selecting two or more stepped levels of the outdoor-air volume percentage (α);
  (d) deriving a linear function which expresses a relation between the outdoor-air temperature (To) and the mixed-air temperature (Tm) for each level of the outdoor-air volume percentage (α) by using the return-air temperature (Tr) and the total heat-exchange efficiency (η); and
  (e) deciding that in a range where the mixed-air temperature (Tm) is lower than the supply-air temperature (Ts) for each of the linear functions within a range of the outdoor-air temperature (To) in the winter season (W), the range where the mixed-air temperature (Tm) in each linear function comes closest to the supply-air temperature (Ts) as compared with the mixed-air temperatures (Tm) in other linear functions is a setting retention range (W1, W2) where setting of the outdoor-air volume percentage (α) in the corresponding linear function is retained;

wherein the air conditioner is controlled by allowing each of the setting retention ranges to correspond to a time period in units of months or days, and during the time period, retaining the setting of the total heat-exchange efficiency (η) and the outdoor-air volume percentage (α) for the corresponding setting retention range.

3. An air conditioner controlling method for forming mixed air (M) by mixing outdoor air (OA) having a predetermined outdoor-air temperature (To) with return air (RA) having a predetermined return-air temperature (Tr) at a predetermined outdoor-air volume percentage (α), the outdoor air (OA) making a total heat exchange with exhaust air (EA) at a predetermined total heat-exchange efficiency (η), and if a mixed-air temperature (Tm) of the mixed air (M) differs from a specified supply-air temperature (Ts), then cooling or heating the mixed air (M) and sending supply air (SA) having the specified supply-air temperature (Ts), comprising the steps of:

in a process of deciding on the total heat-exchange efficiency (η) and the outdoor-air volume percentage (α) in a summer season (S),
  (a) deciding on the supply-air temperature (Ts) and the return-air temperature (Tr) as specified design values;
  (b) deciding that the total heat-exchange efficiency (η) is a specified value;
  (c) selecting two or more stepped levels of the outdoor-air volume percentage (α);
  (d) deriving a linear function which expresses a relation between the outdoor-air temperature (To) and the mixed-air temperature (Tm) for each level of the outdoor-air volume percentage (α) by using the return-air temperature (Tr) and the total heat-exchange efficiency (η); and
  (e) deciding that in a range where the mixed-air temperature (Tm) is lower than the supply-air temperature (Ts) for each of the linear functions within a range of the outdoor-air temperature (To) (S), the range where the mixed-air temperature (Tm) in each linear function comes closest to the supply-air temperature (Ts) as compared with the mixed-air temperatures (Tm) in other linear functions is a setting retention range (S1, S2) where setting of the outdoor-air volume percentage (α) in the corresponding linear function is retained;

wherein the air conditioner is controlled by allowing each of the setting retention ranges to correspond to a time period in units of months or days, and during the time period, retaining the setting of the total heat-exchange efficiency (η) and the outdoor-air volume percentage (α) for the corresponding setting retention range.

* * * * *